(12) United States Patent
Matson

(10) Patent No.: US 7,044,739 B2
(45) Date of Patent: May 16, 2006

(54) SYSTEM FOR CONTROLLED NUTRITION CONSUMPTION

(76) Inventor: Gary A. Matson, 2862 W. Athens, Fresno, CA (US) 93711

( * ) Notice: Subject to any disclaimer, the term of this patent is extended or adjusted under 35 U.S.C. 154(b) by 0 days.

(21) Appl. No.: 10/849,396

(22) Filed: May 18, 2004

(65) Prior Publication Data

US 2005/0014111 A1    Jan. 20, 2005

Related U.S. Application Data

(62) Division of application No. 10/346,512, filed on Jan. 16, 2003.

(60) Provisional application No. 60/350,209, filed on Jan. 17, 2002.

(51) Int. Cl.
    *G09B 19/00* (2006.01)
(52) U.S. Cl. .................................................. 434/127
(58) Field of Classification Search ................ 434/127, 434/262; 220/575; 600/300; 73/426, 427, 73/429; 482/9; D7/553.2, 553.4
    See application file for complete search history.

(56) References Cited

U.S. PATENT DOCUMENTS

| | | | | |
|---|---|---|---|---|
| 2,096,825 | A | 10/1937 | Roman | 206/47 |
| 2,526,602 | A | 10/1950 | Crumrine | 206/1 |
| D200,867 | S | 4/1965 | Haifley | D44/10 |
| 3,977,106 | A * | 8/1976 | Kapp | 40/495 |
| 4,075,769 | A | 2/1978 | Young | 35/1 |
| 4,165,565 | A | 8/1979 | Cloutier et al. | 33/174 T |
| 4,464,122 | A * | 8/1984 | Fuller et al. | 434/262 |
| 4,966,295 | A | 10/1990 | Parrish | 220/22.3 |
| 4,976,622 | A * | 12/1990 | Clark | 434/127 |
| 5,007,743 | A | 4/1991 | Brennan | 374/141 |
| 5,338,202 | A * | 8/1994 | Saari | 434/127 |
| 5,402,679 | A * | 4/1995 | Vogel | 73/427 |
| 5,560,653 | A | 10/1996 | Beppu | 283/117 |

(Continued)

FOREIGN PATENT DOCUMENTS

GB    2 119 633 A    11/1983

(Continued)

OTHER PUBLICATIONS

ICSI: "Lose the Fat, Keep the Muscle", 1999.*

(Continued)

*Primary Examiner*—Kurt Fernstrom
(74) *Attorney, Agent, or Firm*—Haverstock & Owens LLP

(57) ABSTRACT

The current invention is directed towards a system for and a method of modifying eating habits of a user. The system and method utilize a set of fixed volume containers that are graduated to provide a user means to control the volume of food consumed over time. In accordance with the instant invention, the contents of the containers are consumed over time according to a schedule which identifies the appropriate containers and the frequency of the meals to be consumed each day. Preferably, the method of the instant invention is utilized for weight reduction, wherein the volume of food consumed per meal is reduced over time while frequency of meals consumed over time is simultaneously increased over time in order to balance the nutritional intake of the user. The fixed volume containers can be pre-filled or provide the user with a measuring means to portion his/her own food. The system and method can be customized to suit the dietary goals of an individual and can be used along with a printed and/or electronic schedule and/or a workbook to further motivate the user to modify his/her eating habits to achieve a set of user goals.

29 Claims, 7 Drawing Sheets

U.S. PATENT DOCUMENTS

| | | | | |
|---|---|---|---|---|
| 5,908,301 A | * | 6/1999 | Lutz | 434/236 |
| 6,083,006 A | * | 7/2000 | Coffman | 434/127 |
| 6,102,706 A | | 8/2000 | Khoo et al. | 434/127 |
| 6,296,488 B1 | * | 10/2001 | Brenkus et al. | 434/127 |
| 6,428,320 B1 | * | 8/2002 | Archuleta et al. | 434/127 |

FOREIGN PATENT DOCUMENTS

| | | | |
|---|---|---|---|
| GB | 2119633 | * | 11/1983 |

OTHER PUBLICATIONS

"Oct.-Lose the Fat Keep the Muscle", 2 pages.

Dieter's Digest, "Portion Practice" May 2002, Weight Loss-Dieters Digest.com, 2 pages.

"What Kind of Diet Should I Follow?", 4 pages.

"Portion Control Program", AVON Wellness Beauty starts from within, 7 pages.

* cited by examiner

SYSTEM FOR CONTROLLED NUTRITION CONSUMPTION

RELATED APPLICATION(S)

This Patent Application is a Divisional Patent Application of co-pending U.S. patent application, Ser. No. 10/346,512, filed on Jan. 16, 2003, and titled "SYSTEM FOR CONTROLLED NUTRITION CONSUMPTION" which claims priority under 35 U.S.C. 119 (e) of the now abandoned U.S. Provisional Patent Application, Ser. No. 60/350,209 filed Jan. 17, 2002, and titled "SYSTEM FOR CONTROLLED NUTRITION CONSUMPTION." The co-pending U.S. patent application Ser. No. 10/346,512, filed on Jan. 16, 2003, and titled "SYSTEM FOR CONTROLLED NUTRITION CONSUMPTION" and the Provisional Patent Application, Ser. No. 60/350,209 filed Jan. 17, 2002, and titled "SYSTEM FOR CONTROLLED NUTRITION CONSUMPTION" are both hereby incorporated by reference.

FIELD OF THE INVENTION

This invention relates to dietary systems and methods. More particularly, this invention relates to systems for and methods of controlling the nutritional intake.

BACKGROUND

Obesity and/or being overweight is one of the most common causes of health problems. There are numerous health benefits which are realized by maintaining a "healthy" weight. The best way to control a person's weight is through regular exercise and a well balanced diet. Under extreme cases of obesity, weight loss is facilitated through medication(s) to curve the appetite, and/or surgery, whereby staples are used to physically reduce the volume of the stomach that is available.

No matter how overweight the patient is and no matter how aggressive the weight loss treatment, efforts toward achieving a "healthy" or goal weight will ultimately fail if the patient's eating behavior is not modified. In fact, in the absence of corrective eating behavior, aggressive treatments, such as medications and surgery, can lead to the death of the patient.

There are numerous diets and/or methods for cataloging the content and/or nutritional/caloric intake of an individual. Most diet methods are extremely complex and difficult to follow. For example, many diets require special foods that are difficult to find, vitamin supplements that can be expensive, and/or complex documentation that must be maintained by the user to determine the proper caloric intake. Most of these complex diets fail as the person quickly returns to their regular eating habits in frustration.

What is needed is a simple system for and method of assisting individuals to control their nutritional consumption without requiring enormous changes in dietary content, which do not necessitate specialized foods or vitamins, and which will gradually modify the eating habits of the person.

SUMMARY OF THE INVENTION

The current invention is directed towards a user friendly system for and method of controlling the nutritional intake of a user; preferably in order to facilitate weight loss of the user. In accordance with an embodiment of the invention, the system includes a set of containers with graduated fixed volumes for holding predetermined quantities of food. The set of containers preferably includes a smaller number of large fixed volume containers, for example three, and a larger number of small fixed volume containers, for example six.

The containers can be pre-filled with one or more food types or can be filled by the user. Food that is filled within the containers is consumed by the user in accordance with a schedule, whereby the volume of food consumed per meal is decreased over time. In accordance with a preferred embodiment of the invention, the frequency of meals is simultaneously increased over time such that a sufficient daily nutritional intake is provided for the user to maintain a healthy and active life style.

In accordance with an embodiment of the invention, the containers are sectionalized for holding foods from different food groups. In addition to sections, the containers can have lids and means for identifying the lids with a compatible container and/or for identifying a scheduled container. The system and/or the containers can also have identification means and/or a menu for indicating which type(s) of food are recommended for each container or component. The menu can, for example be, removable and secured to a portion of the lid or a container body with a transparent envelope feature.

The system can also include a printed or electronic workbook for displaying the schedule to the user and for allowing the user to make entries which document their progress towards a set of user goals.

The system and method of the instant invention can be customized or tailored to individuals based on their initial health and/or weight condition. For example, a more overweight person may start off with a larger container size than a less overweight person. While the instant invention is described primarily as a system for and method of controlling nutritional intake for weight loss, it will be clear to one of ordinary skill in the art that the system and method of the instant invention has a number of uses, including providing a system for and method of maintaining the weight and controlling the nutritional intake of a healthy person with an average or healthy weight. Further, reverse procedures to those described for weight reduction may be used to facilitate weight gain and/or to treat persons having eating disorders. Additional features and details of the instant invention are provided in the following figures.

DETAILED DESCRIPTION OF THE PREFERRED EMBODIMENTS

Figure 1:
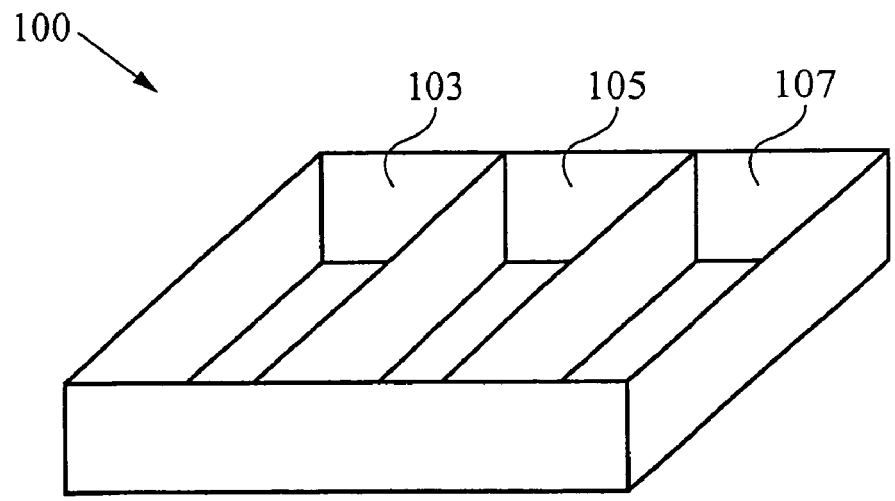
FIG. 1 is a schematic representation of a set of containers, in accordance with the instant invention.
Figure 1:
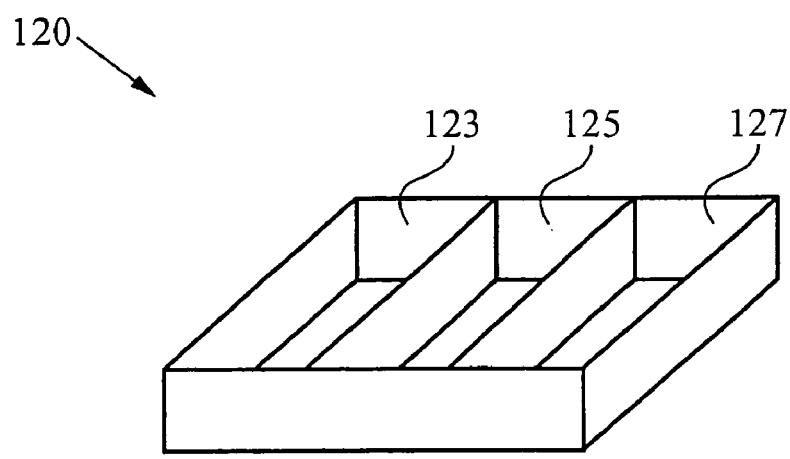
Figure 1:
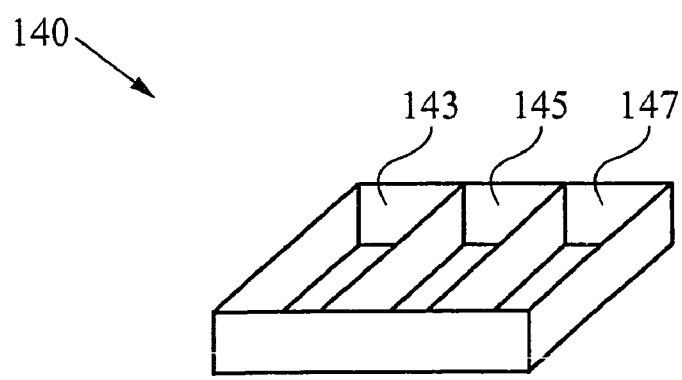

FIG. 1 shows a set of containers 100, 120 and 140 that are subdivided into sections 103/105/107, 123/125/127 and 143/145/147, respectively. The containers 100, 120 and 140 are volumetrically graduated to measure fixed volumes of food or foods that are consumed by a person each meal, viz one container for each meal. While three containers are shown here, the system and method of the instant invention can utilize any number of containers with predetermined and fixed volumes. For example, the system can have three large containers 100 corresponding to three meals per day and six smaller containers 140 corresponding to six smaller meals per day. Alternatively, one of each container 100, 120 and 140 can be used and then re-washed to provide a prescribed number of meals per day. Also, the set of containers can comprise any number of different size containers. For example, in an extended diet plan, ten or more different size containers can be necessary.

In a weight loss program, a user is provided with a set of containers, as described above. The user migrates from measuring the amount of food per meal with a larger fixed volume container to measuring the amount of food per meal with a smaller fixed volume container over a prescribed period of time. The containers can be pre-filled with food or, alternatively, the user can use the containers to measure their own portions of food. The length of time that any one of the containers 100, 120 and 140 is used and which of the containers 100, 120 and 140 a user starts with in the dietary program can depend on a number of factors, including the user's body fat and a desired weight loss.

Preferably, the user is provided with a schedule (not shown) which outlines the type of containers to use in a given time frame, how often to use the containers and when to switch to new containers. Also preferably, the schedule simultaneously provides for an the user maintains a sufficient nutritional intake to remain healthy and active. The schedule can be displayable within a workbook that is printed or is electronic. The user can make entries for monitoring their progress towards a set of goals into this workbook.

Each of the containers can be provided with a lid (not shown), which can be color coded or otherwise marked to indicate its proper usage in the schedule. The system and/or lids can also include a menu providing a list of recommended foods and/or nutritional information for the recommended foods.

Figure 2:
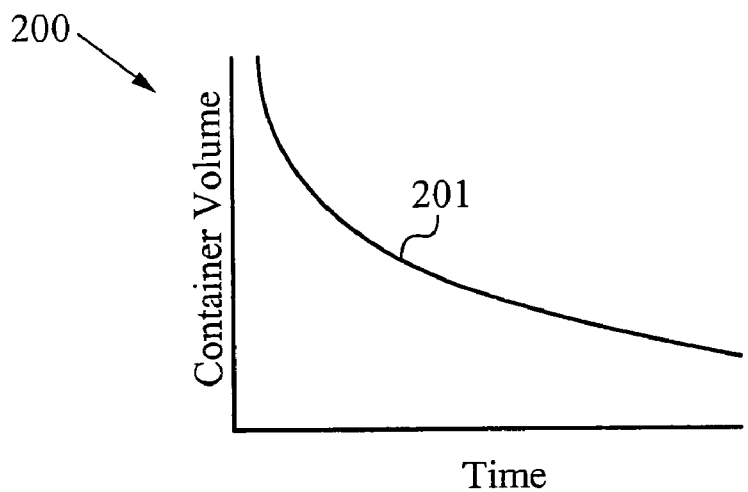
FIG. 2 is a graphical representation of the volume of food per meal, the frequency of the meals and the total nutritional intake over time, in accordance with the method of the instant invention.
Figure 2:
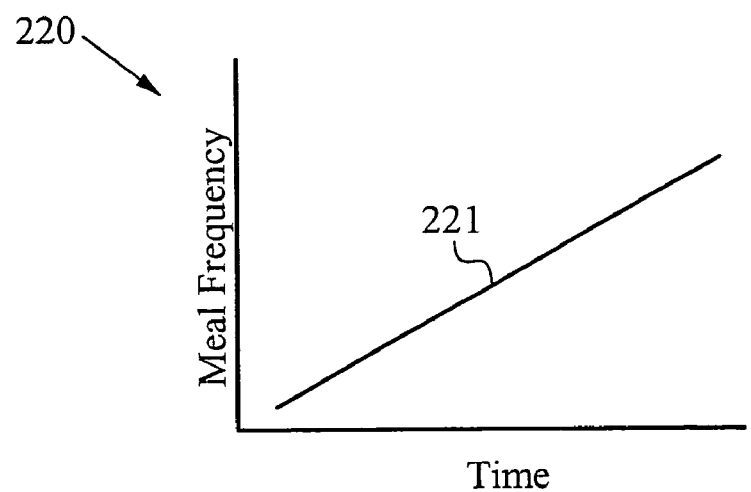
Figure 2:
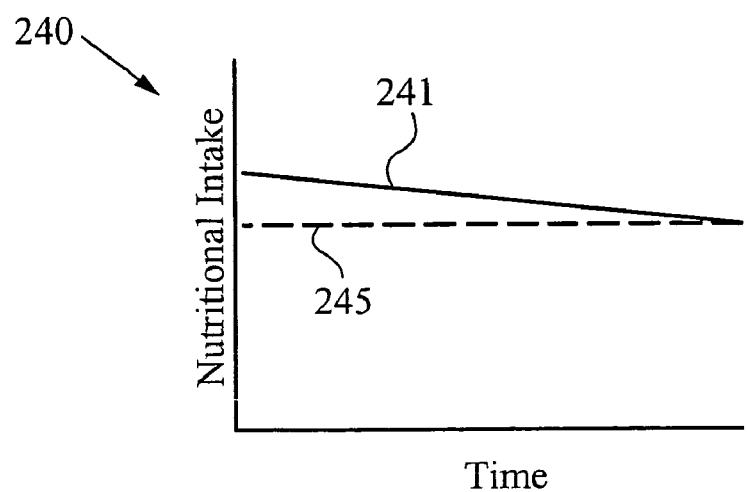

FIG. 2 plots the volume of food consumed per meal 200, the frequency of meals consumed per day 220 and the nutritional intake of the user per day over an extended period of time 240. From the line 201 it can be seen that a volumetric decrease in food consumed per meal can be exponential over time, while the frequency of the meals consumed over time, as shown by line 221, can be increased in a more linear fashion. Accordingly, the total nutritional intake of the user, plotted by line 241, can decrease to a normal "healthy" or goal level 245. In accordance with the invention, the volumetric decrease per meal 201 and increase in frequency of meals per day 221 can be adjusted to have any number of effects, including the effect that the nutritional intake over time 241 remains substantially constant. In some instances, it may be advantageous to design a program whereby the overall nutritional intake increases over time, especially for patients suffering from anorexia or other eating disorders.

The instant invention provides a user friendly system and method for controlling nutritional intake through volumetric and frequency control using a set of containers having fixed volumes that are used to measure food according to a schedule. The system and method can be used alone or in combination with exercise, medication and other therapies to achieve the desired effect. The system and method of the instant invention are particularly useful for modifying the eating patterns of patients prior to surgery to facilitate weight loss, but can be used to modify the eating patterns of persons having a variety of health conditions and needs.

Figure 3A:
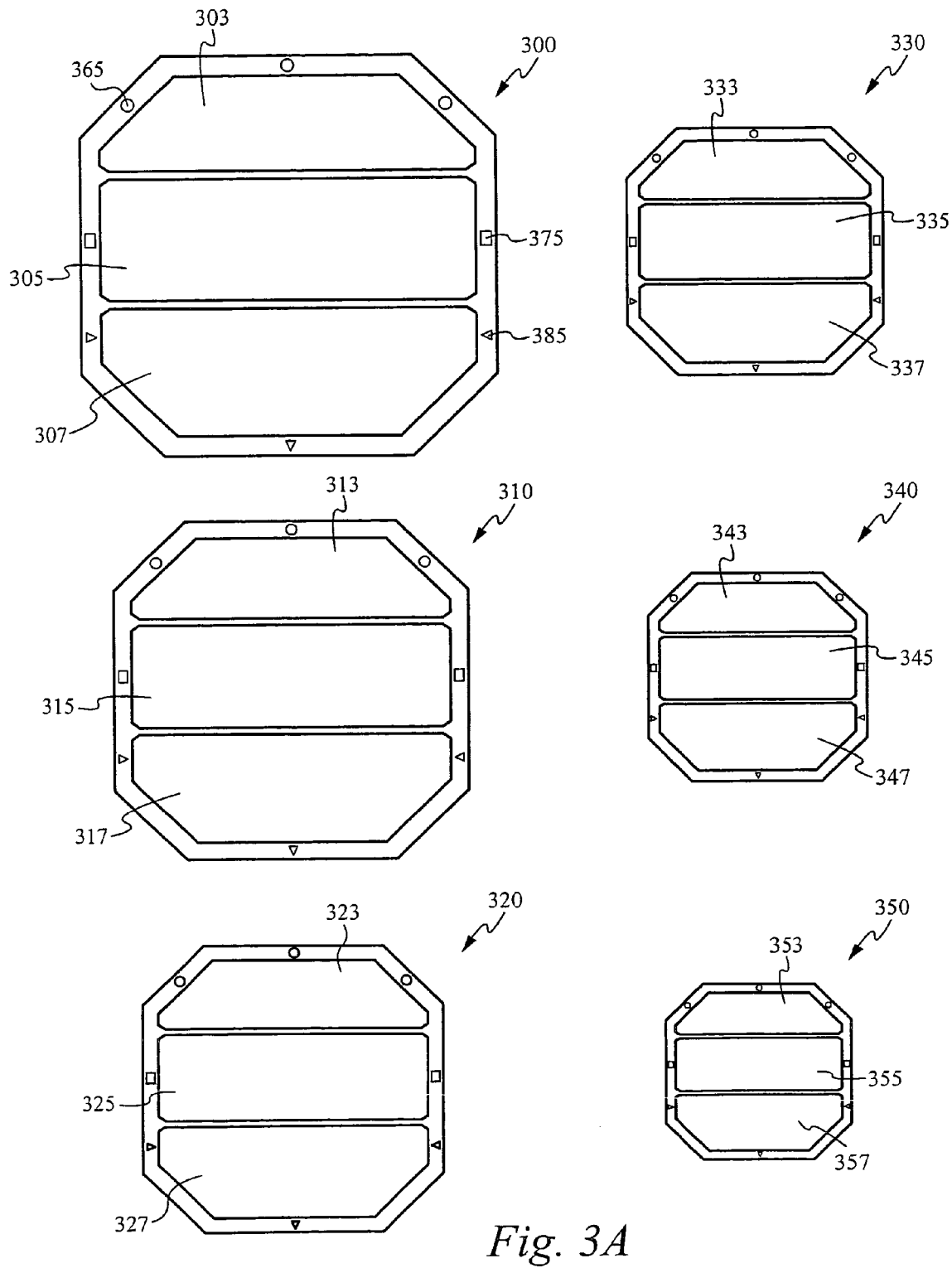
FIG. 3A is a schematic representation of an embodiment of the containers with graphics in accordance with the instant invention.
Figure 3B:
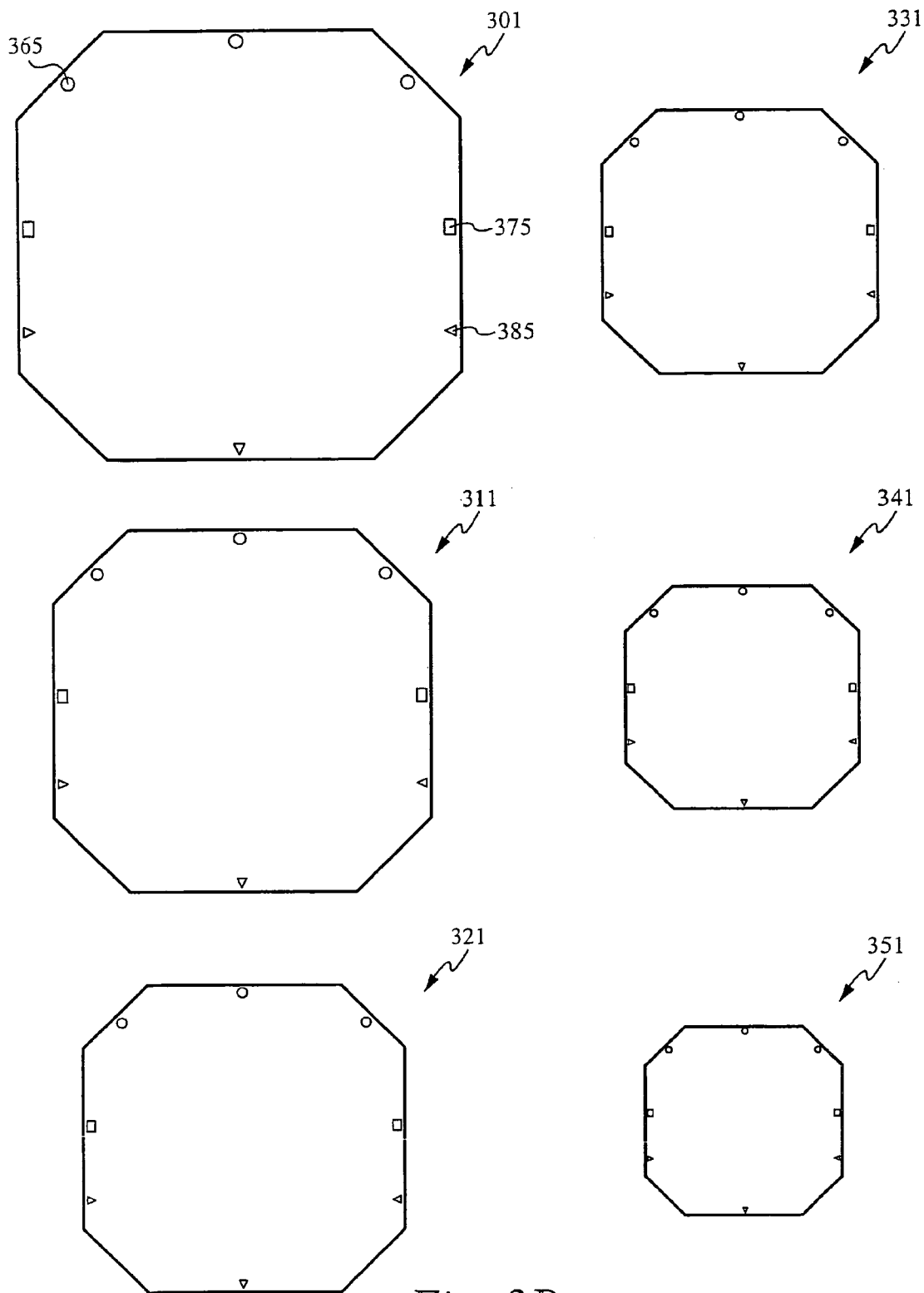
FIG. 3B is a schematic representation of an embodiment of the lids with graphics in accordance with the instant invention.
Figure 3C:
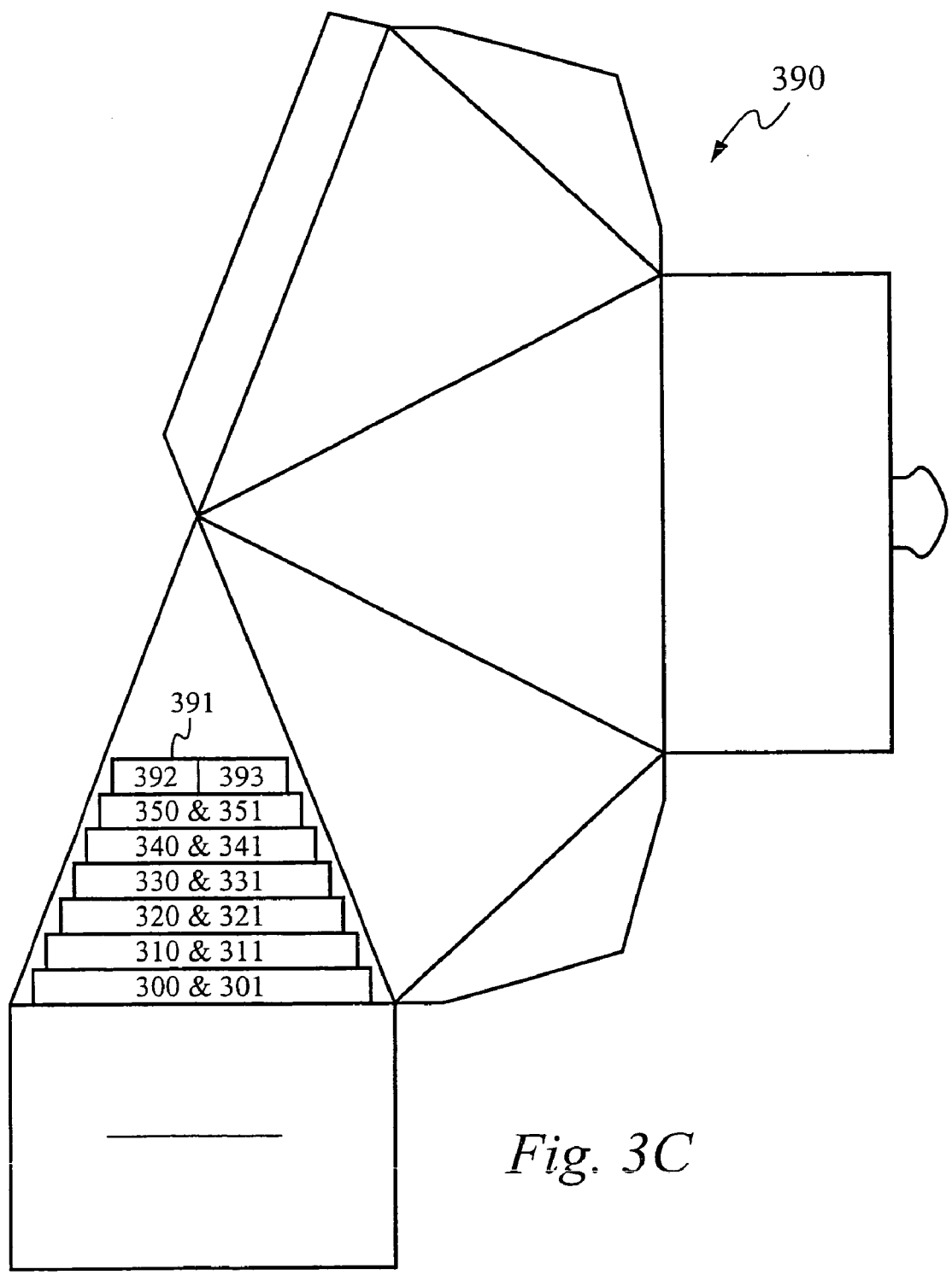
FIG. 3C is a schematic representation of an embodiment of the packaging in accordance with the instant invention.

FIG. 3 shows an embodiment of the current invention with graphics and lid. Specifically, FIG. 3 shows a set of containers 300, 310, 320, 330, 340, and 350 that are subdivided into sections 303/305/307, 313/315/317, 323/325/327, 333/335/337, 343/345/347, 353/355/357, respectively. Each set of containers 300, 310, 320, 330, 340, and 350 also have a corresponding lid 301, 311, 321, 331, 341, and 351, respectively. Furthermore, each set of containers 300, 310, 320, 330, 340, and 350 and their corresponding lids 301, 311, 321, 331, 341, and 351, have symbols 365, 375, 385 which serve to identify different dietary food groups. Specifically, the symbol 365 (●) represents simple carbohydrates including but not limited to starches, breads, and grains, the symbol 375 (■) represents proteins including but not limited to meats and meat substitutes, and the symbol 385 (▲) represents complex carbohydrates including but not limited to fruits and vegetables. The subdivided sections 303/305/307, 313/315/317, 323/325/327, 333/335/337, 343/345/347, 353/355/357, have fixed volumes which are volumetrically graduated to measure fixed volumes of food. The containers 300, 310, 320, 330, 340, and 350 are preferably utilized for measuring a separate meal. The user migrates from measuring the amount of food per meal with a larger fixed volume container to measuring the amount of food per meal with a smaller fixed volume container over a prescribed period of time.

Still referring to FIG. 3, in accordance with the embodiments of the invention, a system comprises the set of containers 300, 310, 320, 330, 340, and 350 and corresponding lids 301, 311, 321, 331, 341, and 351 which are preferably packaged in a functional packaging 390. The functional packaging 390 further comprises an envelope feature 391 for holding a menu 392 and a dietary schedule 393. In alternate embodiments of the present invention, the functional packaging 390 could be comprised of a dietary schedule or workbook to be used by the user to determine how to utilize the controlled nutrition consumption system and to maintain a user log detailing user data including, but not limited to, nutritional consumption data and user weight. The dietary schedule 393 consists of a workbook for the user to make entries for monitoring their progress towards a set of goals and instructions for the proper use of the set of containers.

The tables below describe a specific example showing use of the set of containers described above for controlling nutrition consumption. Specifically, Tables 1 and 2 provide the approximate dimensions of Tray 1 (largest) through Tray 6 (smallest) and the dimensions of the corresponding subdivided sections of these six trays. In addition, the tables below provide an example of the daily Kcal to be consumed by the user while utilizing the set of containers for controlling nutrition consumption and the number of times per day each tray is utilized. The symbols ●/■/▲ in Table 2 correspond to the different dietary food groups to be placed within each subdivided section of each tray. Specifically, the ● represents the subdivided section of the tray for holding simple carbohydrates including, but not limited to, starches, breads, and grains, the ■ represents the subdivided section of the tray for holding proteins including, but not limited to, meats and meat substitutes, and the ▲ represents the subdivided section of the tray for holding complex carbohydrates including, but not limited to, fruits and vegetables.

TABLE 1

| Tray | Daily Kcal Consumed | Total Tray Dimensions (Approx.) | Times Tray Used/Day |
|---|---|---|---|
| 1 | 2,000 | 11" × 6.00" × 1" | 3 |
| 2 | 1,748 | 10.31" × 5.62" × 1" | 3 |
| 3 | 1,527 | 9.66" × 5.27" × 1" | 3 |
| 4 | 1,334 | 8" × 4.2" × 1" | 4 |
| 5 | 1,165 | 6.5" × 3.62" × 1" | 5 |
| 6 | 1,018 | 5.7" × 3.0" × 1" | 6 |

TABLE 2

| Subdivided Tray Sections | Corresponding Dimensions of Subdivided Tray Sections (Approx.) |
|---|---|
| ●/■/▲ | 4.25"/2.23"/4.5" |
| ●/■/▲ | 3.99"/2.11"/4.22" |
| ●/■/▲ | 3.74"/1.98"/3.96" |
| ●/■/▲ | 3.1"/1.64"/3.28" |
| ●/■/▲ | 2.52"/1.33"/2.66" |
| ●/■/▲ | 2.21"/1.17"/2.34" |

Figure 4A:
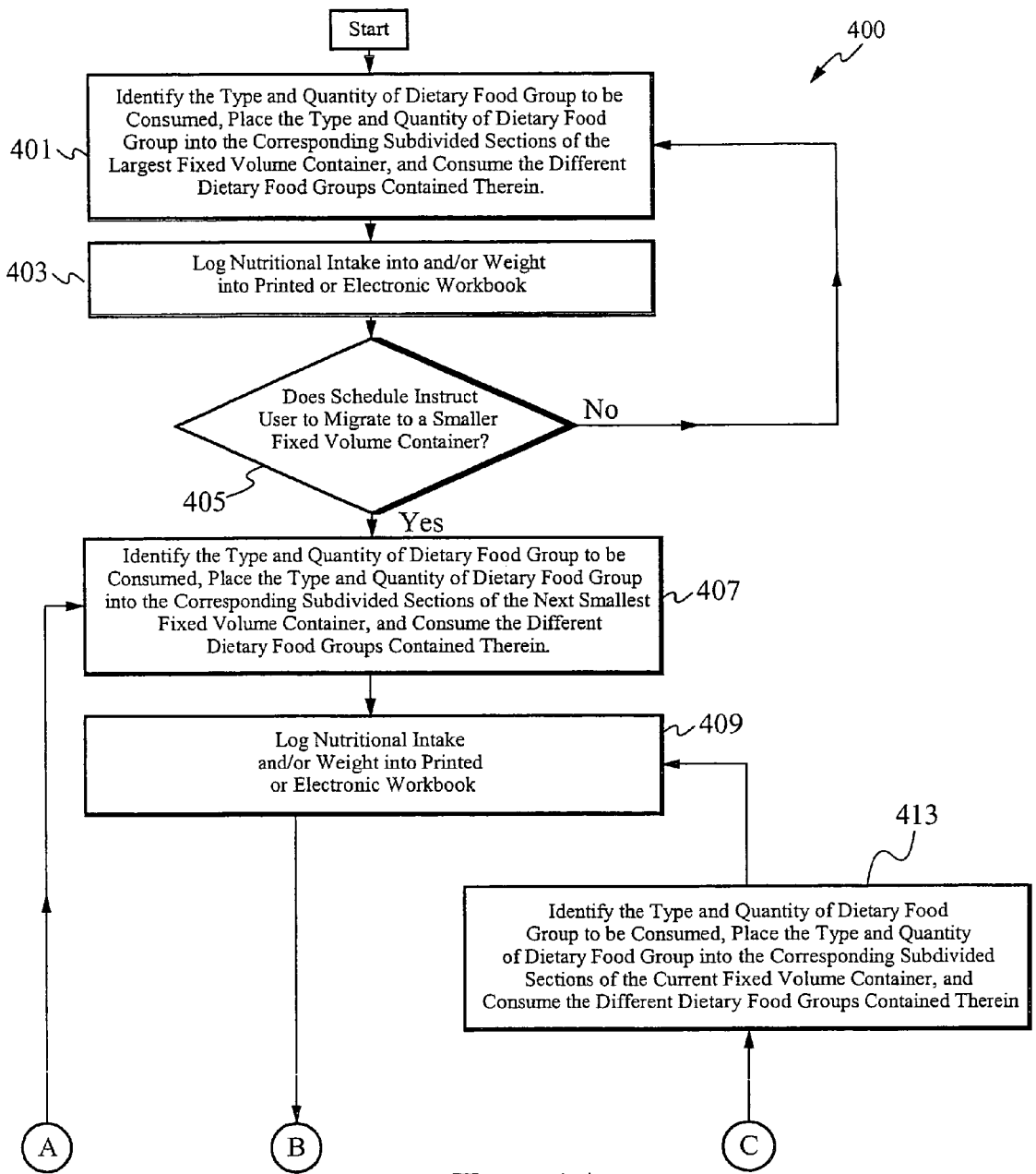
FIG. 4A is the first part of a flow chart illustrating steps of the preferred method of the instant invention.
Figure 4B:
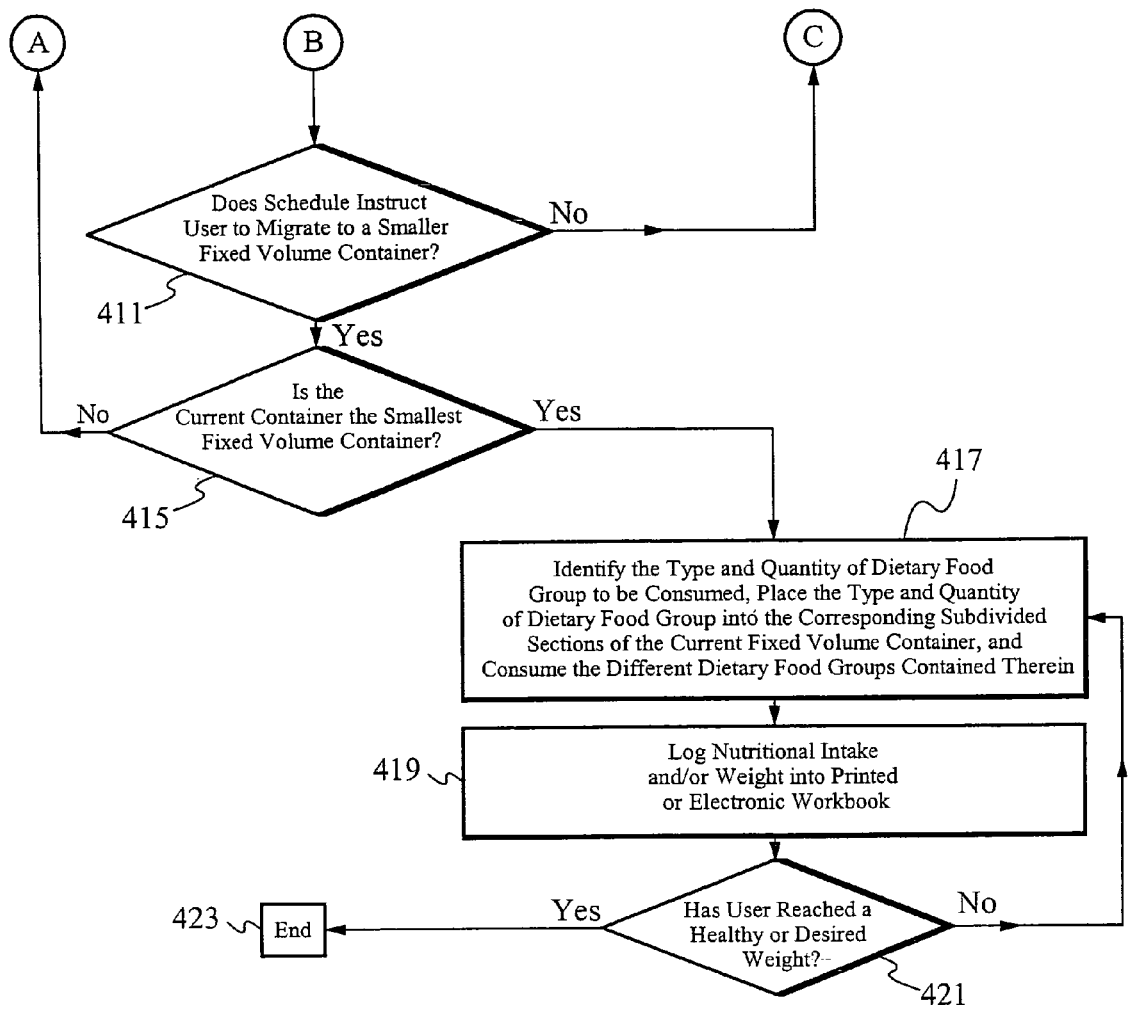
FIG. 4B is the second part of the flow chart 4A illustrating steps of the preferred method of the instant invention.

FIGS. 4A and 4B show a flow chart illustrating steps of the preferred method of the present invention. Specifically, 400 details the steps for a user to control their nutrition consumption by utilizing the preferred method of the present invention. In the step 401 the user identifies the type and quantity of dietary food group to be consumed, places the type and quantity of dietary food group into the corresponding subdivided sections of the largest fixed volume container, and consumes the different dietary food groups contained therein. Following step 401, in the step 403, the user logs their nutritional intake and/or weight into a printed or electronic workbook. Following the user logging their nutritional intake and/or weight into a printed or electronic workbook in the step 403, the user, in the step 405, refers to the schedule and determines whether the schedule instructs the users to migrate to a smaller fixed volume container. If, in the step 405, the user determines that the schedule has instructed the user to migrate to a smaller fixed volume container, then the user, in the step 407 identifies the type and quantity of dietary food group to be consumed, places the type and quantity of dietary food group into the corresponding subdivided sections of the next smallest fixed volume container, and consumes the different dietary food groups contained therein. Following identifying the type and quantity of dietary food group to be consumed, placing the type and quantity of dietary food group into the corresponding subdivided sections of the next smallest fixed volume container, and consuming the different dietary food groups contained therein in the step 407, the user, in the step 409, logs their nutritional intake and/or weight into the printed or electronic workbook. If on the other hand, in the step 405, the user determines that the schedule has not instructed the user to migrate to a smaller fixed volume container, then the user returns to the step 401 identifies the type and quantity of dietary food group to be consumed, places the type and quantity of dietary food group into the corresponding subdivided sections of the largest fixed volume container, and consumes the different dietary food groups contained therein. The user continues to perform the steps 401, 403, and 405 until the schedule instructs the user to migrate to a smaller fixed volume container in the step 405.

Still referring to FIG. 4, following the step 409, the user, in the step 411, refers to the schedule and determines whether the schedule instructs the user to migrate to a smaller fixed volume container. If, in the step 411, the user determines that the schedule has not instructed the user to migrate to a smaller fixed volume container, then the user in the step 413 identifies the type and quantity of dietary food group to be consumed, places the type and quantity of dietary food group into the corresponding subdivided sections of the current fixed volume container, and consumes the different dietary food groups contained therein. However, if in the step 411 the user determines that the schedule has instructed the user to migrate to a smaller fixed volume container, then the user, in the step 415 determines whether the current container being utilized is the smallest fixed volume container. If the user, in the step 415, determines that the current container is not the smallest fixed volume container, then the user returns to the step 407 and identifies the type and quantity of dietary food group to be consumed, places the type and quantity of dietary food group into the corresponding subdivided sections of the next smallest fixed volume container, and consumes the different dietary food groups contained therein. The user continues to perform the steps 407, 409, 411, and 415 until the current container being utilized by the user is the smallest fixed volume container.

If the user determines that the current container is the smallest fixed volume container, than the user, in the step 417 identifies the type and quantity of dietary food group to be consumed, places the type and quantity of dietary food group into the corresponding subdivided sections of the current smallest fixed volume container, and consumes the different dietary food groups contained therein. Following the step 417, the user, in the step 419, logs their nutritional intake and/or weight into a printed or electronic workbook. Following logging their nutritional intake and/or weight into a printed or electronic workbook in the step 419, the user determines whether they have reached a healthy or goal weight. If the user has determined that they have reached a healthy or goal weight in the step 421, then the user ceases to utilize the containers for controlled nutritional consumption. If on the other hand, the user determines in the step 421 that they have not reached a healthy or goal weight, then the user returns to the step 417 and identifies the type and quantity of dietary food group to be consumed, places the type and quantity of dietary food group into the corresponding subdivided sections of the current smallest fixed volume container, and consumes the different dietary food groups contained therein. The user continues to undertake the steps 417, 419, and 421 until the user has reached a healthy or goal weight and the step 423 end.

Other embodiments of the present invention include containers that are pre-filled with different dietary food groups. These pre-filled containers may be purchased and utilized by a user in accordance with the system and method for controlled nutrition consumption. Alternatively, these pre-filled containers could be packaged such that the user can purchase multiple containers and store for later consumption in accordance with the system and method for controlled nutrition consumption. In yet another embodiment of the present invention, the containers include an attachment which can be adhered to a separate dietary schedule or workbook allowing the user to maintain a log detailing their nutritional intake. The attachment could be, for example, an adhesive label containing information regarding the nutritional intake and values of the dietary food groups contained within the pre-filled container that is peeled off of the pre-filled container and adhered to a separate dietary schedule or workbook following consumption of the contents of the container by the user.

Weight and obesity are not only image factors in today's society, but are very important in the health and well being of millions. Even though it is very important for people to maintain a healthy or goal weight, the many difficulties associated in current dietary habits as well as dieting systems and methods make achieving this goal nearly impossible for some. Further, most diets tend not to work for very long because they are not sustainable. Many of the difficulties and dangers associated with dieting and improper eating habits can be avoided if users are provided with an easy to use system and method for controlling their nutritional consumption. The current system and method serves as a efficient and effective manner to control a user's nutritional consumption and change their eating habits. By following the present invention, a user will be able to not only lose weight, but also maintain their weight loss in the long term. In addition, the present invention provides a system and method for a diet that is balanced, healthy, and easy enough to follow in the long term.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

The invention claimed is:

1. A method of controlling nutritional intake of a person comprising:
    a. regulating meals based on a customized schedule that instructs a user to use a container from a set of containers having greater fixed volumes and to migrate to containers from within the set of containers having smaller fixed volumes based on progress towards a user goal, wherein the customized schedule further instructs the user with a frequency with which to use each of the containers as the user migrates from using the container with the greater fixed volumes to the containers with the smaller fixed volumes; and
    b. volumetrically controlling the meals, by measuring the meals with the set of containers based on the customized schedule.

2. The method of claim 1, further comprising controlling the nutritional value of the meals.

3. The method of claim 2, wherein controlling the nutritional value of the meals comprises selecting foods from a menu.

4. The method of claim 1, wherein regulating the frequency of the meals comprises increasing the frequency over time.

5. The method of claim 1, further comprising generating the user goals.

6. The method of claim 5, wherein the schedule is customized for the user based on the user's starting weight and age.

7. The method of claim 6, wherein the user goal includes a change in weight from an initial weight.

8. The method of claim 1, wherein the schedule is contained in a workbook, the method further comprising providing entries into the workbook for documenting user progress towards the user goals.

9. The method of claim 8, wherein the workbook is electronic.

10. The method of claim 1, wherein the frequency of the meals is increased over time such that the nutritional intake is substantially constant over time.

11. A method of controlling nutritional consumption comprising:
    a. utilizing a set of containers each with fixed volumes that are graduated throughout the set and configured to hold and measure predetermined quantities of food corresponding the fixed volumes; and
    b. migrating from using containers within the set of containers with greater fixed volumes to containers within the set of containers with smaller fixed volumes based on a customized schedule that identifies a first container from the set of containers and a frequency for a user to measure the predetermined quantities of food with the first container, the customized schedule further providing instructions for the user to migrate to a second container from the set of containers based on a user goal.

12. The method of claim 11, wherein each of the containers within the set is sectionalized and configured to hold foods from different food groups.

13. The method of claim 11, wherein each of the containers within the set comprises identification means for identifying which containers within the set of containers are scheduled for use.

14. The method of claim 11, wherein each of the containers within the set comprises identification means for identifying types of recommended food.

15. The method of claim 11, further comprising the step of the user utilizing a workbook in conjunction with the customized schedule.

16. The method of claim 15, wherein the workbook provides entries for the user to document progress.

17. The method of claim 11, wherein each of the containers within the set comprises a lid.

18. The method of claim 17, wherein the lid includes a menu with suggested foods to be placed within each container.

19. The method of claim 17, wherein the lid includes a customized schedule to be referred to by the user in determining which container to utilize.

20. The method of claim 17, wherein the lid comprises identification means for identifying the lid with a compatible container.

21. A dietary method comprising utilizing a set of containers having a range of fixed volumes for holding and measuring quantities of food based on a customized dietary schedule, wherein the customized dietary schedule identifies which container within the set is to be utilized and when the user is to migrate to a different container from the set of containers based on the user's monitored progress toward a user goal.

22. The method of claim 21, wherein the set of containers comprises a smaller number of containers with larger fixed volumes and a larger number of containers with smaller fixed volumes.

23. The method of claim 21, wherein each of the containers within the set comprises color coding based on the customized dietary schedule.

24. The method of claim 21, wherein each of the containers within the set are subdivided into a plurality of compartments for holding foods from different dietary food groups.

25. The method of claim 21, wherein the customized dietary schedule is an electronic schedule.

26. The method of claim 21, wherein the customized dietary schedule is contained in a workbook.

27. A method of controlling dietary consumption comprising:
   a. monitoring a weight of user, and
   b. utilizing a customized schedule based on the user in conjunction with a set of containers for measuring food, wherein the customized schedule instructs the user which container within the set to use to measure the food and what frequency to eat the measured food based on changes in the weight of the user, wherein the customized schedule further instructs the user to migrate from using containers within the set with greater fixed volume containers to measure the food to containers within the set with a smaller fixed volume containers to measure the food.

28. The method of claim 27, wherein each of the containers within the set comprises graduated volumes for holding predetermined quantities of food.

29. The method of claim 27, wherein the customized schedule comprises instructions specific for the user.

* * * * *

UNITED STATES PATENT AND TRADEMARK OFFICE
CERTIFICATE OF CORRECTION

PATENT NO.       : 7,044,739 B2
APPLICATION NO.  : 10/849396
DATED            : May 16, 2006
INVENTOR(S)      : Gary A. Matson It is certified that error appears in the above-identified patent and that said Letters Patent is hereby corrected as shown below:

<u>IN THE TITLE PAGE - ITEM (76) INVENTOR</u>

Replace "2862 W. Athens" with –2863 W. Athens–

At Column 3, Line 38, between –an– and –the– add "increase in meal frequency while reducing the volume of each individual meal, such that".

Signed and Sealed this

Twenty-second Day of August, 2006

JON W. DUDAS
*Director of the United States Patent and Trademark Office*